US012553422B2

(12) United States Patent
Mercier et al.

(10) Patent No.: US 12,553,422 B2
(45) Date of Patent: Feb. 17, 2026

(54) INLINE FLUID DISPENSE PUMP ASSEMBLY

(71) Applicant: FLUID METERING, INC., Syosset, NY (US)

(72) Inventors: Nicolas Mercier, Huntington, NY (US); Thomas Breitenstein, Albertson, NY (US); Kevin Mazurkiewicz, Holtsville, NY (US)

(73) Assignee: FLUID METERING, INC., Syosset, NY (US)

( * ) Notice: Subject to any disclaimer, the term of this patent is extended or adjusted under 35 U.S.C. 154(b) by 246 days.

(21) Appl. No.: 18/238,837

(22) Filed: Aug. 28, 2023

(65) Prior Publication Data

US 2024/0068458 A1 Feb. 29, 2024

Related U.S. Application Data

(60) Provisional application No. 63/402,705, filed on Aug. 31, 2022.

(51) Int. Cl.

| | |
|---|---|
| ***F04B 13/00*** | (2006.01) |
| ***F04B 7/00*** | (2006.01) |
| ***F04B 9/02*** | (2006.01) |
| ***F04B 11/00*** | (2006.01) |
| ***F04B 17/03*** | (2006.01) |

(Continued)

(52) U.S. Cl.

CPC ............ *F04B 13/00* (2013.01); *F04B 7/0007* (2013.01); *F04B 9/02* (2013.01); *F04B 11/0058* (2013.01); *F04B 17/03* (2013.01); *F04B 49/06* (2013.01); *F04B 49/065* (2013.01); *F16H 25/2003* (2013.01)

(58) Field of Classification Search

CPC .......... F04B 9/02; F04B 17/03; F04B 7/0007; F04B 13/00; F04B 11/0058; F04B 49/065; F04B 49/06

See application file for complete search history.

(56) References Cited

U.S. PATENT DOCUMENTS 4,941,808 A 7/1990 Qureshi et al.
5,312,233 A * 5/1994 Tanny .................... F04B 13/00 417/415

(Continued)

FOREIGN PATENT DOCUMENTS

DE 4401198 A1 4/1995

OTHER PUBLICATIONS

European Patent Office search report corresponding to Application No. 23194423.2-1004, dated Feb. 1, 2024.

*Primary Examiner* — Peter J Bertheaud
(74) *Attorney, Agent, or Firm* — Duane Morris LLP

(57) ABSTRACT

An inline pump assembly for dispensing fluids, the pump assembly including a pump head, having a piston wherein movement of the piston causes the pump head to dispense a fluid. A linear actuator has a lead screw wherein actuation of the linear actuator causes the lead screw to move along a linear path. A first anti-backlash device is disposed between the linear actuator and the pump head. The anti-backlash device includes a rail having a sliding block thereon. The slide block and rail are engaged to prevent movement of the slide block about a longitudinal axis of the rail. A coupler is fixedly secured to the linear slide and having a first end connected to the lead screw and a second end connected to the piston rod.

15 Claims, 9 Drawing Sheets

(51) Int. Cl.
*F04B 49/06* (2006.01)
*F16H 25/20* (2006.01)

(56) References Cited

U.S. PATENT DOCUMENTS

| | | | |
|---|---|---|---|
| 7,219,570 | B2 | 5/2007 | Erikson et al. |
| 7,428,846 | B2 | 9/2008 | Vukovic |
| 7,552,657 | B2 | 6/2009 | Erikson et al. |
| 7,708,535 | B2 | 5/2010 | Peeler et al. |
| 7,758,013 | B2 | 7/2010 | Arai et al. |
| 7,841,251 | B2 | 11/2010 | Bogue |
| 7,992,456 | B2 | 8/2011 | Schroeder et al. |
| 8,018,528 | B2 | 9/2011 | Westerweck et al. |
| 8,535,198 | B2 | 9/2013 | Fong et al. |
| 8,941,554 | B2 | 1/2015 | Christie |
| 8,978,497 | B2 | 3/2015 | Bourgoine et al. |
| 9,010,205 | B2 | 4/2015 | Schroeder et al. |
| 9,505,433 | B2 | 11/2016 | Kimoto |
| 9,797,916 | B2 | 10/2017 | Connolly et al. |
| 9,815,161 | B2 | 11/2017 | Lin et al. |
| 9,903,452 | B2 | 2/2018 | Tseng |
| 9,964,201 | B2 | 5/2018 | Lin et al. |
| 10,520,070 | B2 | 12/2019 | Turpin et al. |
| 10,583,500 | B2 | 3/2020 | Ke et al. |
| 10,612,316 | B2 | 4/2020 | Ritchie et al. |
| 10,634,135 | B2 | 4/2020 | Elder et al. |
| 10,738,865 | B2 | 8/2020 | Levin et al. |
| 10,767,744 | B2 | 9/2020 | Kleiss |
| 10,934,897 | B2 | 3/2021 | Kameda et al. |
| 10,975,940 | B2 | 4/2021 | Laskovy et al. |
| 10,989,283 | B2 | 4/2021 | Mcauley |
| 11,046,067 | B2 | 6/2021 | Izume |
| 11,105,366 | B2 | 8/2021 | Knight et al. |
| 11,105,404 | B2 | 8/2021 | Borgarelli et al. |
| 11,306,716 | B2 | 4/2022 | Bell |
| 2008/0152515 | A1 | 6/2008 | Karg et al. |
| 2020/0238458 | A1 | 7/2020 | Nakatomi et al. |
| 2020/0393027 | A1 | 12/2020 | Ricard et al. |
| 2021/0016864 | A1 | 1/2021 | Mcbain |
| 2021/0033374 | A1 | 2/2021 | Feda |
| 2021/0278010 | A1 | 9/2021 | Murai |
| 2021/0404524 | A1 | 12/2021 | Al-Mahski et al. |
| 2022/0145879 | A1* | 5/2022 | Rawlings ................ F04B 13/00 |

* cited by examiner

INLINE FLUID DISPENSE PUMP ASSEMBLY

The present application claims the benefit of priority to U.S. Provisional Patent Application No. 63/402,705 filed on Aug. 31, 2022, the content of which is incorporated by reference herein in its entirety.

FIELD OF INVENTION

The present invention relates generally to liquid pumping systems, wherein a fluid is moved from a supply vessel to a receiving vessel. More particularly, the present invention relates to a mechanized inline pump that can be used in various clinical analyzers.

BACKGROUND

U.S. Pat. No. 5,536,471 describes a mechanized syringe pump of the prior art that has now been in use for more than twenty-five years. Numerous design refinements have been implemented during this time without departing from the basic concepts disclosed in this patent. There are, however, several reliability problems, which continue to plague this type of mechanized syringe pump and despite considerable time and effort devoted to solving these problems, they remain troublesome.

Inline piston pumps move fluid by pulling and pushing on a piston or plunger, generally using a stepper motor to generate the linear motion. This is usually accomplished using a linear actuator electric motor, coupled to the piston/plunger. The linear actuator has a threaded rod through the center of the motor, which mates with an internally threaded cylinder inside the motor. When the motor rotates, the lead screw also rotates with the motor, unless it is prevented from rotating. If the lead screw cannot rotate, it will move linearly. Thus, a mechanism is needed to prevent the lead screw from rotating. This is usually accomplished using a shaft key inside a keyway, a splined shaft, or a ball bearing riding inside a groove. A typical problem with these designs is the play in the system, which results in inaccuracies whenever the direction of motion is reversed. This play, or slop, in the system is often termed "step loss". It is caused by any backlash between moving components.

Such step loss has typically been addressed through the use of software and calibrating a pump system to compensate for the backlash. A software solution to achieve the target accuracy/precision, however, requires calibrating each system and has limits as to how much correction can be achieved. In addition, implanting software compensation on a pump requires modifying the existing pump control software code found on the machine in which the pump is used. However, pump manufactures/suppliers typically do not have access or control over such software. The machines on which the pumps are used are already out in the field, and thus software modifications cannot be made without significant effort.

Accordingly, it would be desirable to provide a inline pump assembly that efficiently overcomes step loss and accurately and dispensed fluid in a constant manner.

SUMMARY

In one aspect of the present disclosure, an inline fluid dispense pump assembly for aspirating and dispensing fluids is provided.

The present disclosure provides an inline pump assembly for dispensing fluids, the pump assembly including a pump head, having a piston wherein movement of the piston causes the pump head to dispense a fluid. A linear actuator has a lead screw wherein actuation of the linear actuator causes the lead screw to move along a linear path. A first anti-backlash device is disposed between the linear actuator and the pump head. The anti-backlash device includes a rail having a sliding block thereon. The slide block and rail are engaged to prevent movement of the slide block about a longitudinal axis of the rail. A coupler is fixedly secured to the linear slide and having a first end connected to the lead screw and a second end connected to the piston rod.

The present disclosure further provides an inline pump assembly for dispensing fluids, the pump assembly including a pump head, having a piston rod wherein movement of the rod causes the pump head to dispense a fluid. A linear actuator has a lead screw wherein actuation of the linear actuator causes the lead screw to move along a linear path. A linear slide is disposed between the linear actuator and the pump head. The linear slide includes a rail having a slide block thereon. The linear slide and rail are engaged to prevent rotation of the slide about a longitudinal axis of the rail. The lead screw is operably nonrotatably connected to the linear slide, and the piston is operably connected to the linear slide.

The present disclosure still further provides a method of dispensing fluids comprising:

providing an inline pump assembly comprising:

a pump head, having a piston wherein movement of the piston causes the pump head to dispense a fluid;

a linear actuator having a lead screw wherein actuation of the linear actuator causes the lead screw to move along a linear path;

a first anti-backlash device disposed between the linear actuator and the pump head, the anti-backlash device including a rail having a slide block thereon, the slide block and rail cooperating to prevent movement of the slide block about a longitudinal axis of the rail; and a coupler fixedly secured to the linear slide and having a first end connected to the lead screw and a second end connected to the piston rod;

generating a signal from a controller;

responsive to the signal, operating the linear actuator to translate the coupler a predetermined amount, the coupler advancing the pump head to dispense the fluid.

Features of the disclosure will become apparent from the following detailed description considered in conjunction with the accompanying drawings. It is to be understood, however, that the drawings are designed as an illustration only and not as a definition of the limits of this disclosure.

DETAILED DESCRIPTION

Figure 1A:
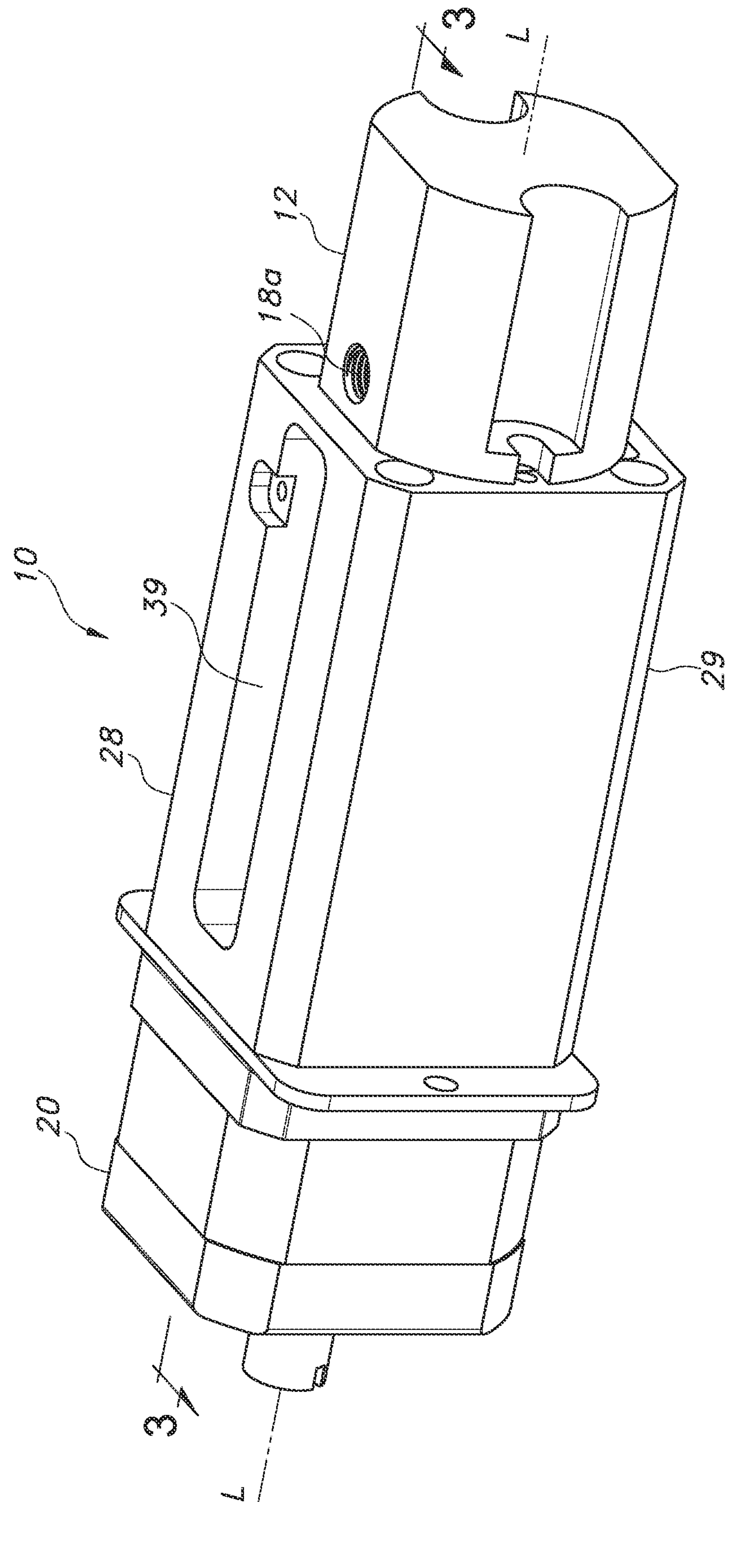
FIG. 1A is a perspective view of an inline fluid dispense pump assembly.
Figure 1B:
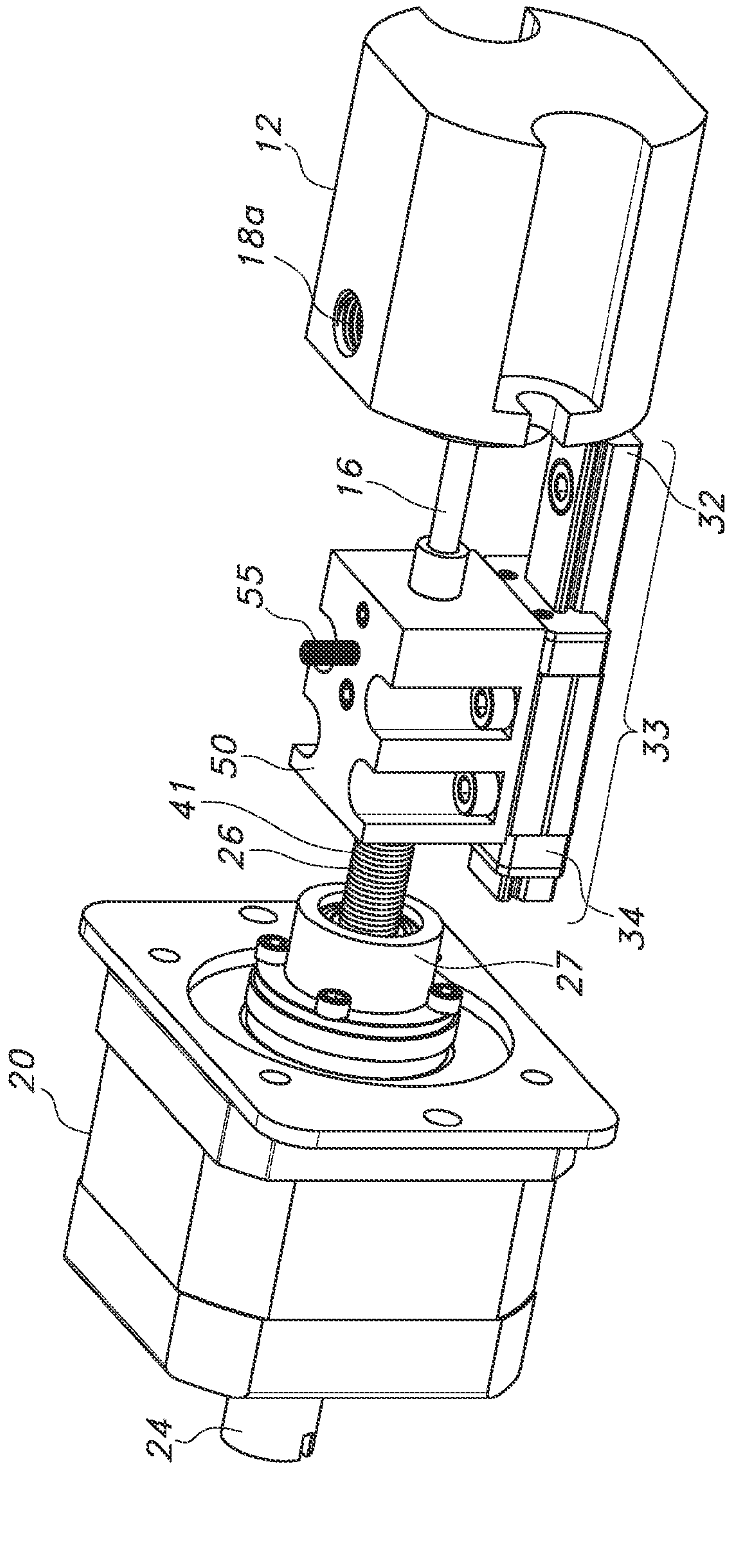
FIG. 1B is a perspective view of the inline fluid dispense pump assembly of FIG. 1A showing a pump drive assembly housing removed for clarity.
Figure 1C:
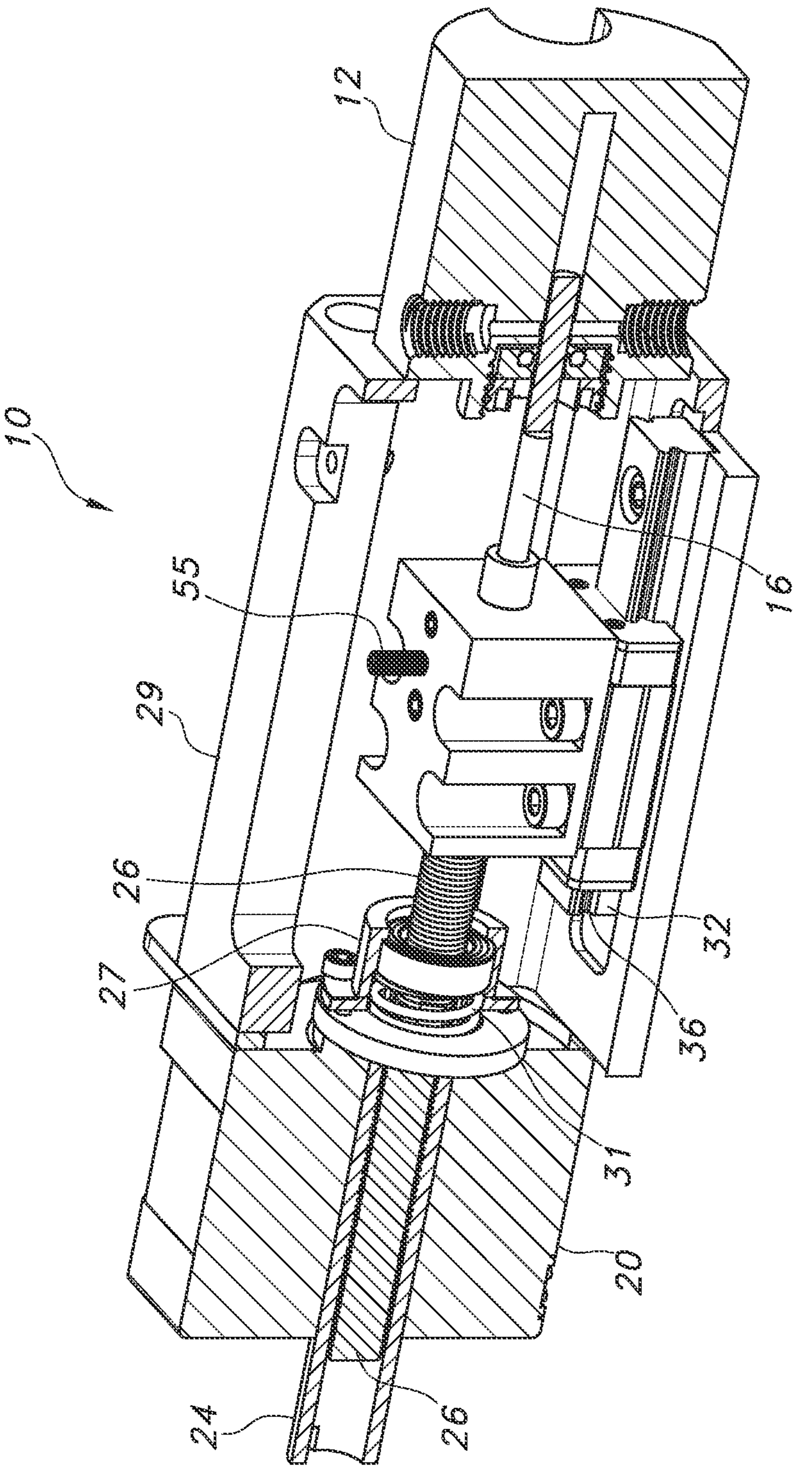
FIG. 1C is a perspective partial cross-sectional view of the inline fluid dispense pump assembly of FIG. 1A.
Figure 2:
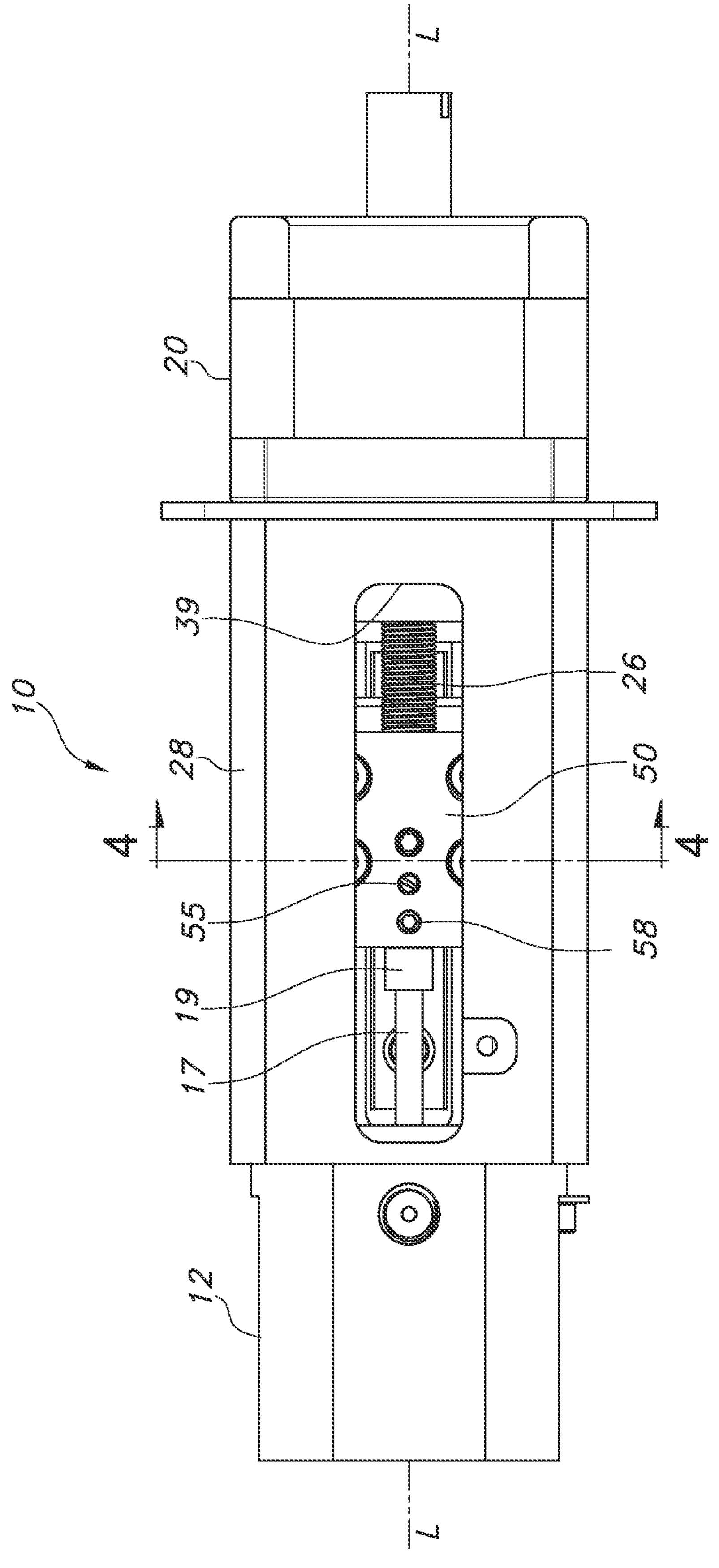
FIG. 2 is a top plan view of the assembly of FIG. 1A.

With reference to FIGS. 1A to 2, the inline fluid dispense pump assembly 10 may generally include a pump head 12, a linear actuator 20, and a pump drive assembly 28, including an anti-backlash mechanism 33. The pump drive assembly 28 is disposed between the linear actuator 20 and the pump head 12. While the assembly 10 is referred to herein as a dispense pump, it is within the contemplation of the present disclosure that the assembly can both dispense and aspirate fluids.

Figure 3:
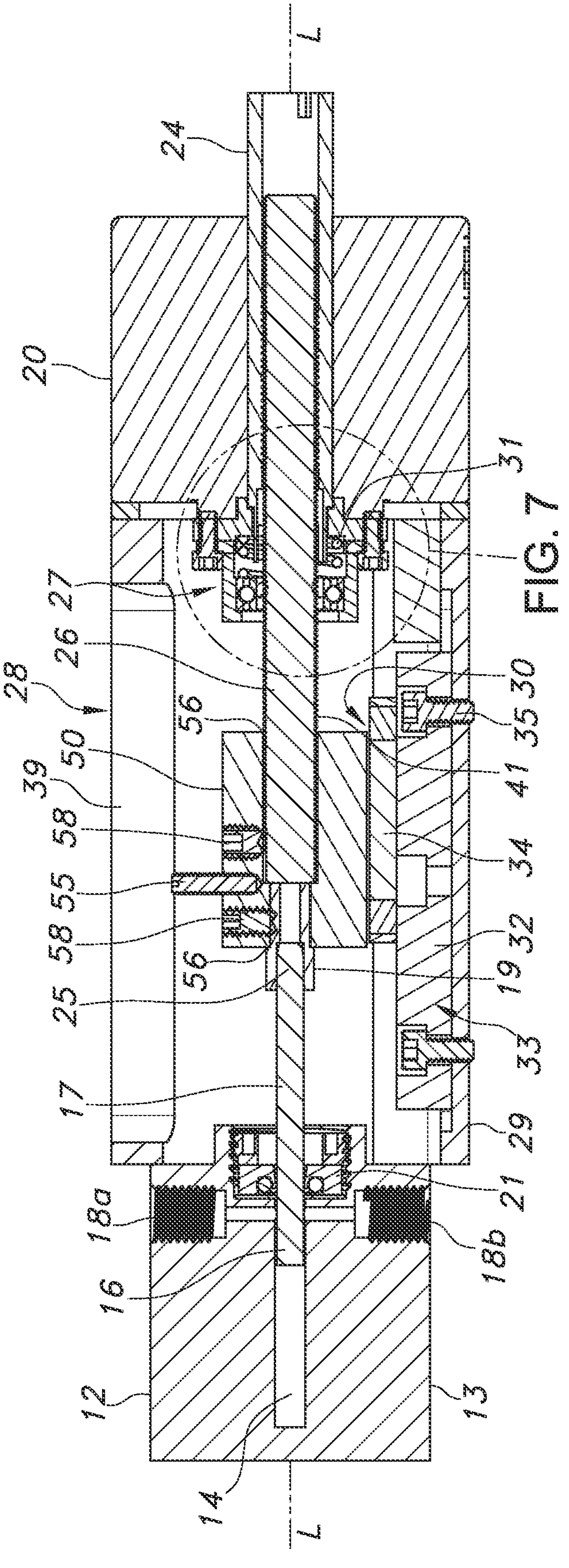
FIG. 3 is a cross-sectional view of the pump assembly taken through the line 3-3 of FIG. 1A.

The pump head 12 may be of a type know in the art and in particular of the type shown in described in U.S. patent application Ser. No. 17/602,142 filed on Dec. 9, 2020, the content of which is incorporated by reference herein in its entirety. With reference to FIG. 3, the pump head 12 includes casing 13 having an internal bore 14. A piston 16 rides within the bore 14. The piston 16, for example, may be made of ceramic, plastic or metal. A piston control portion 17 extends in a sealed manner through a sealing end 21 from the pump housing 13. The bore 14 is in fluid communication with ports 18*a* and 18*b* in order to allow it to aspirate and dispense fluid upon axial motion of the piston. A connector 19 may be secured to a terminal end 25 of the piston control portion to facilitate connection to the assembly 10 as described below. It is within the contemplation of the present discloser that the pump head 12 may be of a variety of designs know in the art for dispensing fluid upon linear motion of a piston.

Figure 6:
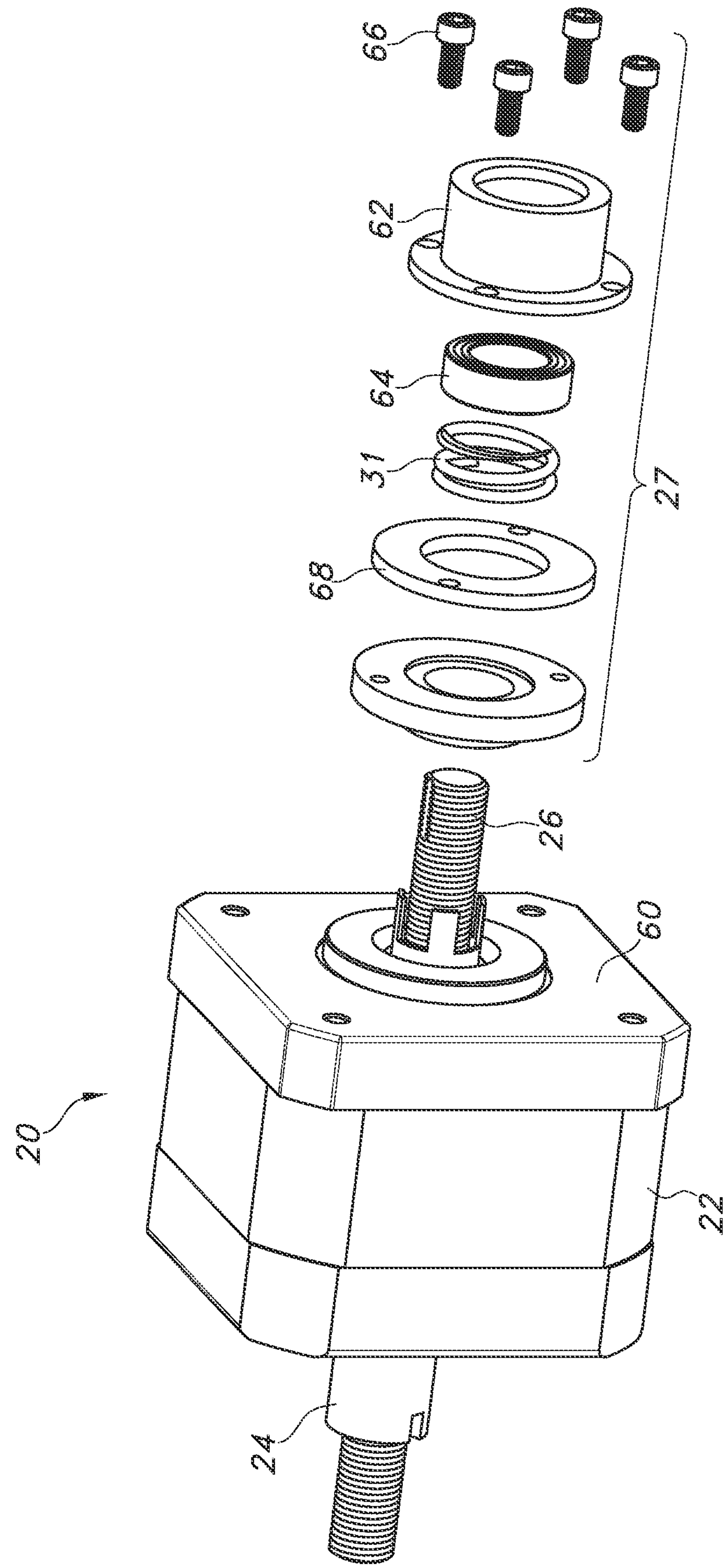
FIG. 6 is an exploded view of a linear actuator portion of the pump assembly
Figure 7:
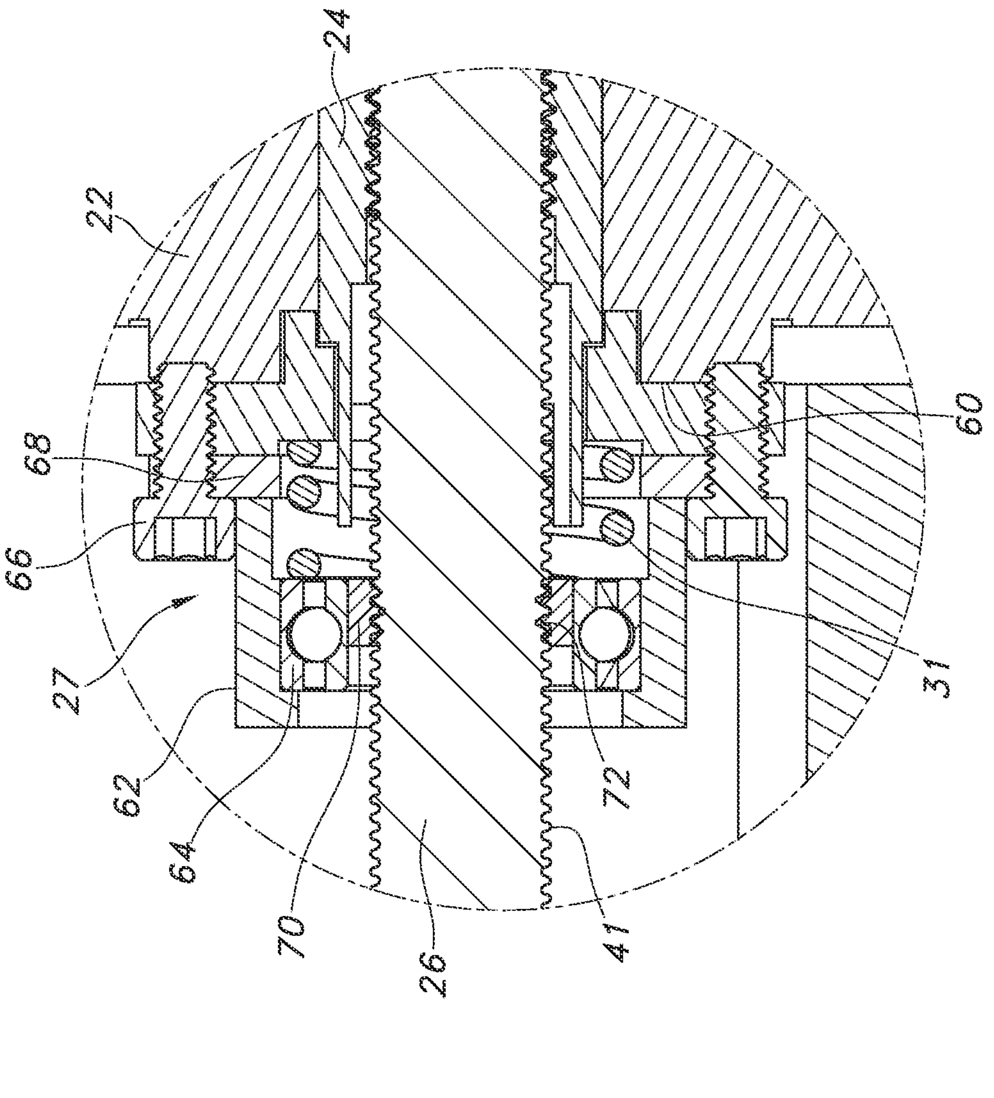
FIG. 7 is a detailed cross-sectional view of a portion of the linear actuator.

With reference to FIGS. 3 and 6-7, the pump head 12 is driven by the linear actuator 20 that converts rotary motion to linear motion. The linear actuator includes a stepper motor 22 that is driven by a motor controller of a type know in the art. The stepper motor 22 rotates an internally threaded drive armature 24 in which a lead screw 26, having external threads 41, is disposed. Rotation of the armature 24 causes the lead screw 26 to move forward and backward along the longitudinal axis L-L of the device depending on the direction of rotation of the armature 24. A spring-loaded mechanism 27 may be disposed on the linear actuator front end 60 to prevent backlash between the threads of the drive armature 24 and the lead screw 26. The mechanism 27 includes a top hat-shaped cap 62 in which an annular bearing 64 is disposed. The cap 62 is secured to the front of the linear actuator with fasteners 66 such that some degree of axial movement of the cap 27 is permitted. A resilient gasket 68 may be disposed between the cap 62 and the linear actuator 20. The gasket 68 provides a seal between the cap 62 and linear actuator but permits the requisite amount of axil movement of the cap 62. A threaded sleeve 70 is fixedly secured within the inside diameter of the annular bearing 64. The sleeve 70 has internal threads that engage the lead screw threads.

A biasing device 31, such as a compression spring, is disposed between the cap 62 and the linear actuator front 60. The biasing device 31 provides an axial force that urges the cap 62 away from the linear actuator. This biasing force keeps the lead screw 26 and the drive armature 24 corresponding external and internal threads in constant engagement. The force of the biasing device 31 also maintains thread engagement between the lead screw external threads 41 and the internal threads 72 of the sleeve. This forced engagement mitigates backlash such that the motion of the drive armature 24 is immediately imparted on the lead screw 26.

Figure 4:
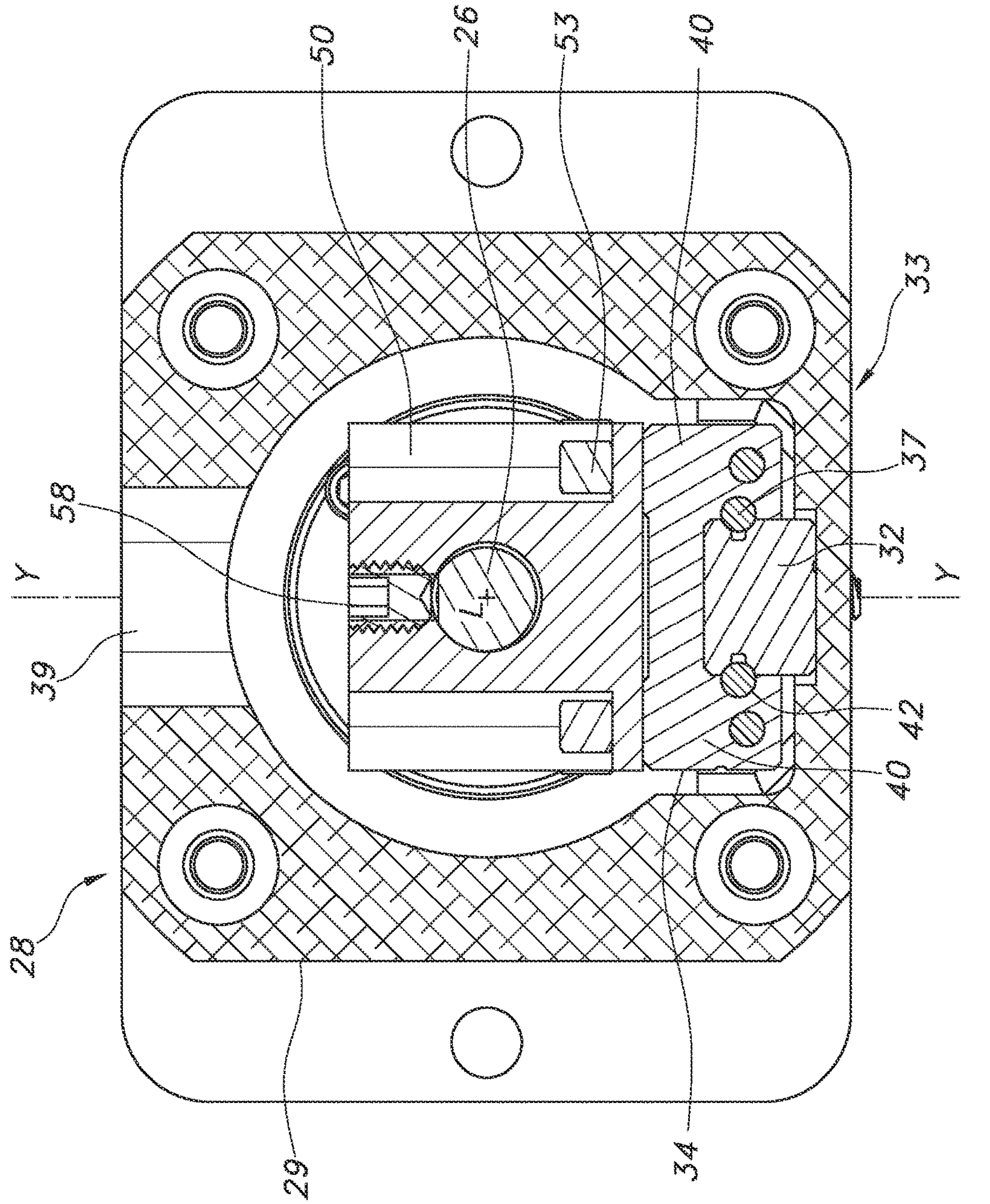
FIG. 4 is a cross-sectional view of the pump assembly shown in FIG. 5, taken along the line 4-4.
Figure 5:
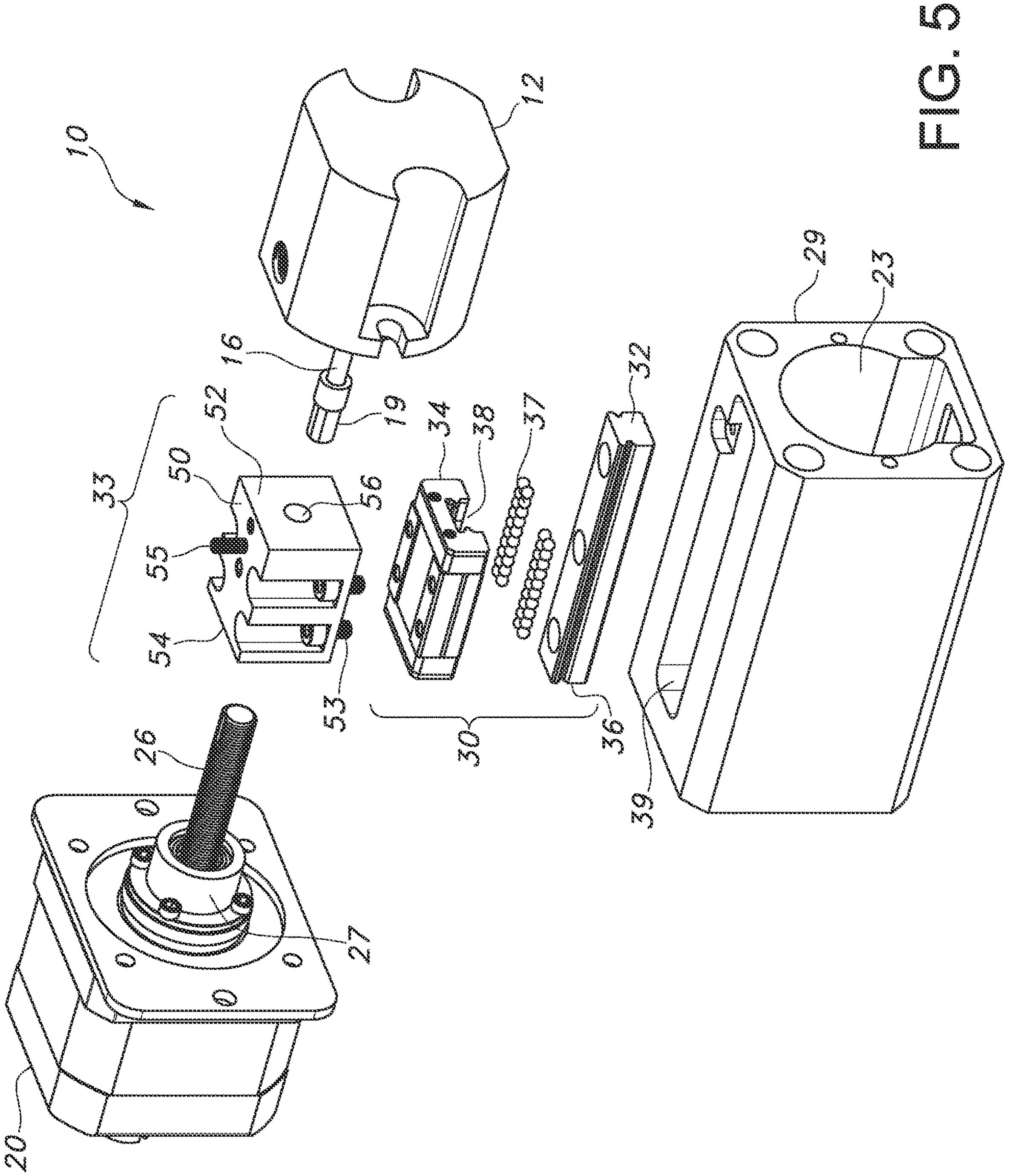
FIG. 5 is an exploded view of the pump assembly.

With specific reference to FIGS. 3 to 5, the anti-backlash mechanism 33 is disposed between the lead screw 26 of the linear actuator 20 and the pump head 12. The anti-backlash mechanism 33 mitigates backlash between the linear actuator 20 and the piston 16 such that the pump head 12 repeatedly and constantly dispenses and/or aspirates the correct amount of fluid. The anti-backlash mechanism 33 is disposed in the rigid housing 29 of the pump drive assembly 28. The anti-backlash mechanism 33 includes a linear slide 30 including a precision ground rail 32 and a slide block 34 riding thereon. The linear slide 30 may of a type known in the art for providing precision linear guided motion. The rail 32 is fixedly secured to the housing 29 by fasteners 35 such that it is aligned along the longitudinal axis L-L. The rail 32 includes longitudinally extending grooves 36 running along opposed sides thereof. The slide block has a C-shaped channel 38 with opposed sidewalls 40. Longitudinally extending recesses 42 in sidewalls 40 extend along the length of the sidewalls 40. A plurality of ball bearings 37 are disposed in the recesses 42 and extend into the rail grooves 36 to help provide smooth motion between the slide block 34 and the rail 32 as well as to restrict any nonlinear axial motion. The engagement between the slide block 34 and the rail 32 is such that rotational movement of the slide block 34 about the longitudinal axis L-L is prevented. In addition, rotation about an axis Y-Y running perpendicular to the rail is also prevented. Thus, there is no backlash between the linear slide 30 and rail 32.

With reference to FIGS. 1B, 1C, and 3 to 5, a coupler 50 is disposed in the housing 29 and fixedly secured to the top surface of the slide block 34 by fasteners 53. The coupler 50 has first and second opposed ends 52 and 54, respectively, each having and opening 56 therein. The coupler first end 52 is attached to the piston connector 19. The piston connector 19 is inserted in the opening and retained therein by a fastener such as a set screw 58. The coupler second end 54 is connected to the lead screw 26. The lead screw 26 may be inserted into opening 56 in the coupler and nonrotatably secured thereto by a set screw 58 of other type of fastening means know in the art. The connection between the lead screw 26 and coupler 50 prevents rotation of the lead screw 26. Therefore, when the drive armature 24 rotates, the lead screw 26 only moves linearly. The coupler 50 may include a trigger flag 55 in the form of a set screw extending outwardly from a top surface of the coupler. The trigger flag 55 may cooperate with an optical, or other type of proximity sensor (not shown), to permit the location of the coupler 50 to be ascertained. The housing 29 may include a longitudinally extending slot 39 on and through its top surface. The slot 39 permits the position of the coupler 50 and the trigger flag 55 thereon to be viewed and to be accessible to trigger the proximity sensor.

In operation, a system controller emits a signal to the stepper motor controller which results in the stepper motor 22 turning and rotating the drive armature 24. The drive armature's motion is imparted on the lead screw 26 that is secured against rotation, therefore, the lead screw 26 begins to translate. Since the slide block and rail prevent any rotational movement there is no backlash resulting from the movement of the lead screw 26. The lead screw's linear motion is imparted on the coupler 50 which is secured to the linear slide 30. The linear slide 30 prevents any rotational movement of the coupler 50. Therefore, all the movement of the lead screw 26 is converted into linear motion of the coupler 50. The coupler 50 moves in a guided manner and translates the piston 16 in a forward direction a predetermined amount to actuate and drive the pump head 12 and dispense a predetermined amount of fluid.

When the direction of movement is to be reversed, the system controller emits a signal causing the motor 22 to reverse direction. The resultant motion of the lead screw 26, through engagement with the coupler 50, is directly imparted on the piston 16 without any play or backlash and the piston 16 moves in a reverse direction. Therefore, the pump head 12 can be repeatedly driven in both directions without any backlash and without any resultant loss of dispensing accuracy. There is no need to use software, sensors or other complex devices to compensate for backlash in an attempt to achieve a desired accuracy. With this pump assembly, dispense accuracy of +/−10 picoliters can be achieved.

The present invention addresses the shortcomings of the prior designs by eliminating the backlash from the system using mechanical means instead of relying on the software. Thus, there is no need to modify or update software code which can be impractical especially in the field. To accomplish this, both areas of known backlash are addressed. The spring-loaded mechanism 27 acts as an anti-backlash mechanism that is incorporated directly onto the motor lead screw to eliminate backlash from the threads. In addition, a further backlash mechanism 28 in the form of the linear slide block with roller ball bearings is used to prevent any rotation of the lead screw 26. By incorporating both an anti-backlash mechanism 33 on the lead screw, and a slide block, any and all mechanical backlash in the system is removed and step loss is effectively eliminated. These system improvements eliminate the inaccuracies seen whenever direction of motion is reversed, and are entirely independent of the driver hardware and software.

While various embodiments of the present invention are specifically illustrated and/or described herein, it will be appreciated that modifications and variations of the present invention may be effected by those skilled in the art without departing from the spirit and intended scope of the invention.

What is claimed is:

1. An inline pump assembly for dispensing fluids, the pump assembly comprising:

a pump head, having a piston wherein movement of the piston causes the pump head to dispense a fluid;

a linear actuator having a lead screw wherein actuation of the linear actuator causes the lead screw to move along a linear path;

a first anti-backlash device disposed between the linear actuator and the pump head, the anti-backlash device including a rail having a slide block thereon, the slide block and rail cooperating to prevent movement of the slide block about a longitudinal axis of the rail; and a coupler fixedly secured to the slide block and having a first end connected to the lead screw and a second end connected to the piston, the coupler further including a flag extending therefrom that is adapted to trigger a proximity sensor to permit the location of the coupler to be ascertained.

2. The assembly as defined in claim 1, wherein the linear actuator includes a drive armature in threaded communication with the lead screw, wherein rotation of the drive armature caused the lead screw to move.

3. The assembly as defined in claim 2, wherein a second anti-backlash device includes a biasing device disposed between the drive armature and the lead screw to maintain threaded engagement therebetween.

4. The assembly as defined in claim 1, wherein the lead screw is nonrotatably secured to the coupler.

5. The assembly as defined in claim 1, wherein a plurality of ball bearings are disposed between the slide block and the rail.

6. The assembly as defined in claim 1, wherein the coupler first end has a hole for receiving an end of the lead screw, the coupler including a fastener for nonrotatably securing the lead screw to the coupler.

7. The assembly as defined in claim 1, wherein the coupler second end has a hole for receiving a control end of the piston.

8. The assembly as defined in claim 7, wherein the control end includes a connection cap secured thereon, the cap extending into the coupler second end hole.

9. The assembly as defined in claim 1, wherein the coupler is disposed within a housing and the housing includes a longitudinally extending slot extending through a housing surf ace, the slot permitting the position of the flag to be accessible to trigger the proximity sensor.

10. An inline pump assembly for dispensing fluids, the pump assembly comprising:

a pump head, having a piston rod wherein movement of the piston rod causes the pump head to dispense a fluid;

a linear actuator having a lead screw and a drive armature, wherein actuation of the linear actuator causes the drive armature to move the lead screw along a linear path, and wherein a biasing device is disposed between the drive armature and the lead screw to maintain threaded engagement therebetween; and a linear slide disposed between the linear actuator and the pump head, the linear slide including a rail having a slide block thereon, the slide block and rail are engaged to prevent rotation of the slide about a longitudinal axis of the rail, the lead screw being operably nonrotatably connected to the linear slide, and the piston being operably connected to the linear slide.

11. The assembly as defined in claim 10, wherein the slide block and rail are engaged to prevent rotation of the slide about an axis perpendicular to the longitudinal axis of the rail.

12. The assembly as defined in claim 10, wherein a coupler is fixedly secured to the slide block and the coupler has a first end connected to the lead screw and a second end connected to the piston rod.

13. The assembly as defined in claim 10, wherein the linear actuator, the linear slide and the pump head are all aligned along a common longitudinal axis.

14. A method of dispensing fluids comprising:

providing an inline pump assembly comprising:

a pump head, having a piston wherein movement of the piston causes the pump head to dispense a fluid;

a linear actuator having a lead screw and a drive armature, wherein actuation of the linear actuator causes the drive armature to move the lead screw along a linear path;

a first anti-backlash device disposed between the linear actuator and the pump head, the anti-backlash device including a rail having a slide block thereon, the slide block and rail cooperating to prevent movement of the slide block about a longitudinal axis of the rail;

a second anti-backlash device includes a biasing device disposed between the drive armature and the lead screw to maintain threaded engagement therebetween; and a coupler fixedly secured to the slide block and having a first end connected to the lead screw and a second end connected to the piston rod;

generating a signal from a controller;

responsive to the signal, operating the linear actuator to translate the coupler a predetermined amount, the coupler advancing the piston to dispense the fluid.

15. The method as defined in claim 14, wherein the linear actuator includes a drive armature in threaded communication with the lead screw, and wherein rotation of the drive armature caused the lead screw to move.

* * * * *